United States Patent
Matsui

(10) Patent No.: US 8,312,315 B2
(45) Date of Patent: Nov. 13, 2012

(54) STORAGE CONTROL DEVICE AND RAID GROUP EXTENSION METHOD

(75) Inventor: Yuko Matsui, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/283,086

(22) Filed: Oct. 27, 2011

(65) Prior Publication Data

US 2012/0072663 A1    Mar. 22, 2012

Related U.S. Application Data

(63) Continuation of application No. 12/292,270, filed on Nov. 14, 2008, now Pat. No. 8,074,106.

(30) Foreign Application Priority Data

Sep. 8, 2008    (JP) .................................. 2008-230228

(51) Int. Cl.
G06F 11/00    (2006.01)

(52) U.S. Cl. ........................... 714/6.22; 714/6.2; 714/6.1

(58) Field of Classification Search .................. 714/6.1, 714/6.22, 6.23, 6.24, 6.2
See application file for complete search history.

(56) References Cited

U.S. PATENT DOCUMENTS

| 5,615,352 A | 3/1997 | Jacobson et al. |
| 6,832,154 B2 | 12/2004 | Nagaki et al. |
| 7,461,176 B2 | 12/2008 | Watanabe |
| 2003/0056142 A1* | 3/2003 | Hashemi ........................... 714/6 |
| 2005/0210322 A1 | 9/2005 | Corrado |
| 2006/0085663 A1* | 4/2006 | Sutoh ................................ 714/1 |
| 2008/0005507 A1 | 1/2008 | Madnani et al. |
| 2009/0055688 A1 | 2/2009 | Hafner et al. |
| 2009/0172464 A1* | 7/2009 | Byrne et al. ...................... 714/5 |

FOREIGN PATENT DOCUMENTS

| JP | H08-115173 | 5/1996 |
| JP | 2004-185256 | 7/2004 |
| JP | 2005-011317 | 1/2005 |
| JP | 2007-323251 | 5/2006 |
| JP | 2007-323252 | 5/2006 |
| JP | 2008-3857 | 6/2006 |
| JP | 2007-102998 | 4/2007 |

* cited by examiner

*Primary Examiner* — Scott Baderman
*Assistant Examiner* — Sarai Butler
(74) *Attorney, Agent, or Firm* — Hitachi America, Ltd.

(57) ABSTRACT

The present invention provides a storage system having a controller that can extend an old RAID group to a new RAID group without decreasing a processing speed. A conversion part reads the data from an unconverted area A1, converts it into the data based on a new RAID organization, and write it into a storage area A3 of the new RAID group. An address management part updates an initial address Ps and a last address Pe saved in a flash memory if the initial address Ps saved in the flash memory and the newest last address Pe of a converted area A2 are matched. When a power failure occurs, it is checked to see whether or not the data within the converted area A2 is correct. The conversion part reads the initial address Ps and the last address Pe from the flash memory to resume a conversion process.

12 Claims, 16 Drawing Sheets

FIG. 3

RAID GROUP EXTENSION MANAGEMENT TABLE T10

| RG# (C10) | EXTENDED STATE (C11) | OLD RAID ORGANIZATION (C12) | NEW RAID ORGANIZATION (C13) | CONVERTED ADDRESS Pe (C14) | UNCONVERTED ADDRESS Ps (C15) | OTHERS (C16) |
|---|---|---|---|---|---|---|
| RG00 | UNIMPLEMENTED | 4D+1P | — | — | — | ... |
| RG01 | UNIMPLEMENTED | 4D+4D | — | — | — | ... |
| RG02 | IMPLEMENTED | 2D+1P | 3D+1P | 0x10000 | 0x40000 | ... |
| RG03 | UNIMPLEMENTED | 6D+2P | — | — | — | ... |

STORAGE CONTROL DEVICE AND RAID GROUP EXTENSION METHOD

CROSS REFERENCE TO RELATED APPLICATIONS

This application is a Continuation of nonprovisional U.S. application Ser. No. 12/292,270 filed on Nov. 14, 2008, which relates to and claims priority from Japanese Patent Application No. 2008-230228, filed on Sep. 8, 2008, now JP Pat. No. 4792490, the entire disclosure of which is incorporated herein by reference.

BACKGROUND OF THE INVENTION

1. Field of the Invention

The present invention relates to a storage control device and a method for extending a RAID group.

2. Description of the Related Art

A storage control device controls a RAID (Redundant Array of Independent Disks) group made up of a plurality of disk drives to generate a RAID organization such as RAID0-6 using a physical storage area provided for each disk drive. One or more logical volumes can be generated in a virtualized physical storage area provided for the RAID group. A logical volume (LU: Logical Unit) is provided for a host computer (hereinafter a host) to store the user data.

The user often decides the storage capacity of the RAID group by estimating the prospective available amount of storage to a certain extent. However, since the amount of data to be managed greatly increases in recent years, it is not uncommon that the storage capacity beyond the first predictive value of the user is required.

As a countermeasure against the insufficient storage capacity of the RAID group, a method for adding a new drive disk to the RAID group, and re-striping all the disk drives including the new disk drive is well known.

Patent document 1: JP-A-2007-323251
Patent document 2: JP-A-2007-323252
Patent document 3: JP-A-2008-003857

SUMMARY OF THE INVENTION

The prior art had no viewpoint of generating a new RAID group having more storage capacity by reusing the disk drives making up the existent RAID group, and protecting the user data during extension of the RAID group. Also, the prior art did not disclose the configuration for extending the RAID group more quickly while protecting the user data.

This invention has been achieved in the light of the above-mentioned problems; and it is an object of the invention to provide a storage control device and a method for extending a RAID group in which a conversion process can be completed relatively quickly without losing the data in the old RAID organization stored in the old RAID group in the case of generating the new RAID group having more storage capacity by adding a new storage device to the old storage device. The other objects of the invention will be clear from the following description of the embodiments.

In order to solve the above object, a storage control device according to one aspect of the invention configures a new RAID group by reusing a plurality of old storage devices making up an old RAID group and adding a new storage device to the old devices. A conversion part performs a conversion process for converting the data in an old RAID organization read from the old RAID group into the data in a new RAID organization corresponding to the new RAID group to store the converted data in the old storage devices and the new storage device making up the new RAID group. Further, the conversion part stores the initial address of a first area storing the data in the old RAID organization, which is not yet converted into the data in the new RAID organization, in the storage area of the new RAID group and the last address of a second area storing the data in the new RAID organization in a first memory. An address management part copies the initial address and the last address at a predetermined point in time from the first memory to a second memory. And the conversion part resumes the conversion process from the predetermined point in time based on the initial address and the last address stored in the second memory if a predetermined failure is detected.

The predetermined point in time can be set as the time when the newest last address is matched with the initial address stored in the second memory. For example, the first memory is a volatile memory, and the second memory is a non-volatile memory. For example, the predetermined failure is the failure that the storage content of the first memory is lost.

A third area, located between the first area and the second area, for storing the data before conversion for the data converted into the data in the new RAID organization and stored in the second area exists in a storage area of the new RAID group, and the conversion part can use the data stored in the third area in resuming the conversion process.

Before writing the data in the new RAID organization into the second area, it may be confirmed whether or not the data to be overwritten with the data in the new RAID organization is stored at a predetermined position of each old storage device or the new storage device, and if the data to be overwritten is stored at the predetermined position, the data in the new RAID organization may be written into the third area.

The conversion process may include a process for reading the data in the old RAID organization from the old RAID group and storing it in the first memory, and a process for converting the data in the old RAID organization stored in the first memory into the data in the new RAID organization and writing it in each old storage device and the new storage device, the processes being performed asynchronously.

The storage control device may further comprise a check part for checking to see whether or not the data in the new RAID organization stored in the second area is correct when the conversion part resumes the conversion process, and a restoration part for restoring the wrong data, using the data in the old RAID organization stored in the old RAID group if the check part determines that the data is wrong.

The data in the new RAID organization and the data in the old RAID organization may have the logical address information indicating the logical address. The check part may extract the logical address information from the data read from the second area, compare the read target address of the data and the logical address indicated in the logical address information, and determine that the correct data is stored at the read target address of the second area, if the read target address and the logical address are matched, or determine that the wrong data is stored at the read target address of the second area, if the read target address and the logical address are unmatched. Further, the restoration part may read the data to be stored at the read target address from the third area and copy it to the read target address.

All or part of the components of the invention may be constituted as a computer program. The computer program may be stored and transferred in a storage medium, or distributed via a communication network such as the Internet.

Also, other combinations of the aspects of the invention may be appropriately made, and included in the scope of the invention.

BRIEF DESCRIPTION OF THE DRAWINGS

FIG. 3 is an explanatory view showing a table for managing the extension of a RAID group.

FIG. 9 is an explanatory view showing how to resume a conversion process interrupted due to a power failure or the like.

DESCRIPTION OF THE PREFERRED EMBODIMENTS

Figure 1:
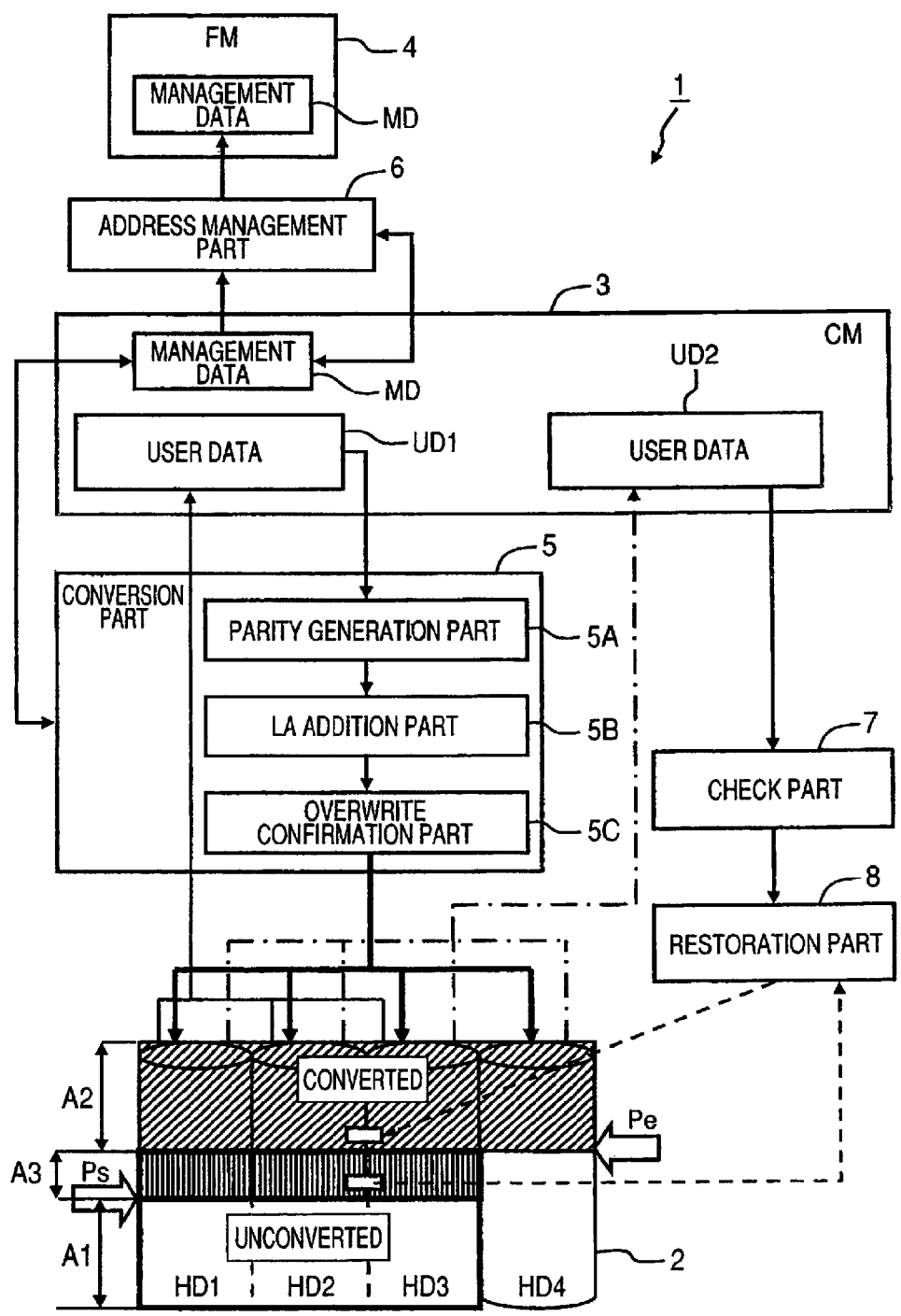
FIG. 1 is an explanatory view showing the concept of an embodiment of the present invention.

The embodiments of the present invention will be described below with reference to the drawings. FIG. 1 is an explanatory view showing the overall concept in a form of the invention. A more detailed configuration example will be clarified in the following embodiment. A storage control device 1 comprises a plurality of disk drives 2, a cache memory 3, a flash memory 4, a conversion part 5, an address management part 6, a check part 7 and a restoration part 8, for example, as shown in FIG. 1.

Each disk drive 2 corresponds to a "storage device". For the sake of convenience, the recording medium is called the "disk drive", but not specifically limited in its shape or form. For example, various storage devices capable of reading and writing the data such as a hard disk drive, a semiconductor memory device, an optical disk device, a magneto-optical disk device, a magnetic tape device and a flexible disk device, for example, can be used in the invention. In the case where the hard disk drive is used, an FC (Fibre Channel) disk, a SCSI (Small Computer System Interface) disk, SATA disk, an ATA (AT Attachment) disk, or an SAS (Serial Attached SCSI) disk, for example, may be used. In the case where the semiconductor memory device is used, various kinds of memory device such as a flash memory, FeRAM (Ferroelectric Random Access Memory), MRAM (Magneto-resistive Random Access Memory), a phase change memory (Ovonic Unified Memory) and an RRAM (Resistance RAM) for example, may be used.

The organization of the storage area for each disk drive 2 will be described below. It is assumed that the disk drives 2 (HD1-HD3) are the existent disk drives 2, and have been used formerly. The existent disk drives 2 (HD1-HD3) make up an old RAID group, and store the data based on an old RAID organization.

In this embodiment, a new disk drive 2 (HD4) is added to the existent disk drives 2 (HD1-HD3), and a new RAID group is generated using all of these new and old disk drives (HD1-HD4). The storage capacity of the new RAID group is greater by the size of the new disk drive 2 (HD4) than the storage capacity of the old RAID group.

Herein, the area storing only the data based on the old RAID organization, which is not converted into the data based on the new RAID organization, is called an unconverted area A1. The area storing only the data based on the new RAID organization is called a converted area A2. The unconverted area A1 is the storage area not subjected to re-striping, and corresponds to a "first area". The converted area A2 is the storage area for which the re-striping is finished, and corresponds to a "second area".

A free area A3 as a "third area" exists between the converted area A2 and the unconverted area A1. The free area A3 is the storage area for which the re-striping is finished, but where the data before re-striping remains. That is, the free area A3 is the storage area based on the old RAID organization, in which the same data exists in the converted area A2. Since the data located in the free area A3 is already converted (re-striped) into the data in the new RAID organization, another data can be overwritten. Accordingly, the third area is called the free area here.

In other words, a part of the data stored in the converted area A2 is also stored in the free area A3. Accordingly, the free area A3 is considered as a dual management area for dually managing the predetermined data within the converted area A2.

The management data MD within the cache memory 3 stores the last address Pe of the converted area A2 and the initial address Ps of the unconverted area A1, in addition to the group number for specifying the RAID group and the organization information for specifying the RAID organization.

The cache memory 3 as the "first memory" is a volatile memory that can be accessed at relatively high speed. The cache memory (CM in the FIG. 3 stores the user data UD1, UD2 read from the disk drive 2 and the management data MD used for extending the RAID group.

In this embodiment, the read of data to the cache memory 3 and the write of data from the cache memory 3 into the disk drive 2 are performed asynchronously. The sequential data transfer is performed between the cache memory 3 and each disk drive 2. The cache memory 3 prefetches the data from the disk drive 2. When the data making up one stripe row of the new RAID organization is fully provided, the data of each stripe is transferred to the corresponding disk drive 2 and written.

The flash memory 4 as the "second memory" is a non-volatile memory, for example. The management data MD stored in the cache memory 3 is stored at a predetermined timing in the flash memory 4.

The conversion part 5 reads the data in units of stripe row from the old RAID group, and converts the address of the read data into the address corresponding to the new RAID organization to write it back into the storage area of the new RAID group. Herein, the stripe means the data of predetermined size for one disk drive that is used for striping. The data in one horizontal row of the stripe (data of the entire stripe) is called the stripe row.

The conversion part 5 comprises a parity generation part 5A, an address information addition part 5B and an overwrite confirmation part 5C, for example. In FIG. 1, the address information is denoted as "LA". The parity generation part 5A calculates the parity for the data in the stripe row.

The address information addition part 5B adds the logical address indicating the target storage of the data to the data of each stripe. For example, assuming that the data size of one stripe is 520 bytes, the data is stored in 512 bytes, and a guarantee code is stored in the remaining 8 bytes. The guarantee code includes the address information indicating the logical address and an LRC (Longitudinal Redundancy Check). For the sake of convenience, the logical address information (LA) in the guarantee code of 8 bytes added to each logical block of 512 bytes is noted in the following explanation.

The overwrite confirmation part 5C confirms whether or not the old data overwritten with the data converted into the stripe row based on the new RAID organization into each disk drive 2 is stored at the predetermined position within each disk drive 2 before writing the data into each disk drive 2. That is, the overwrite confirmation part 5C determines whether or not the old data to be overwritten is already de-staged. If the old data is already de-staged, the conversion part 5 writes the data according to the new RAID organization into each disk drive 2.

The conversion part 5 updates the last address Pe and the initial address Ps included in the management data MD within the cache memory 3 in writing the data according to the new RAID organization into each disk drive 2. That is, the conversion part 5 updates the management data MD within the cache memory 3 before writing the user data into each disk drive 2. The newest last address and initial address are stored in the cache memory 3.

The address management part 6 saves the management data MD within the cache memory 3 into the flash memory 4 when a predetermined timing arrives. The predetermined timing is the timing when the last address Pe stored in the cache memory 3 is matched with the initial address stored in the flash memory 4. That is, the addresses Pe and Ps are saved to the flash memory 4 at the point in time when the newest converted area A2 arrives at the end of the free area A3 at the previous time of saving (or near the top of A1).

In this embodiment, when the management data MD or user data UD1 or UD2 within the cache memory 3 is lost because a power failure occurs in the middle of the conversion process, the conversion process is resumed from the last address of the converted area A2 at the previous time of saving, based on the management data MD within the flash memory 4 and the data stored in the free area A3.

The check part 7 checks to see whether or not the data written into the converted area A2 is correct. The check part 7 reads the user data UD2 from the converted area A2, and stores it in the cache memory 3. The check part 7 extracts the logical address information added to the user data UD2.

The check part 7 determines whether or not the read target address of the user data UD2 and the address obtained from the logical address information are matched. If both the addresses are matched, it is determined that the user data UD2 is correct. If both the addresses are unmatched, it is determined that the user data UD2 is wrong.

For example, there is a case where the user data UD1 is lost because a power failure occurs before the user data UD1 within the cache memory 3 is written into the disk drive 2. In this case, a stripe including the unconverted data occurs within the converted area A2. Thus, the check part 7 checks to see whether or not the data within the conversion area A2 is correct based on the logical address, before resuming the conversion process. It may be determined whether or not the data stored in not only the conversion area A2 but also the free area A3 or the unconverted area A1 is correct.

The restoration part 8 restores the wrong data if the check part 7 determines that the data is wrong. The restoration part 8 detects the correct data corresponding to the address at which the wrong data is stored from the free area A3, and overwrites the wrong data with the correct data to restore the wrong data.

In this embodiment as configured above, in the case where the new disk drive 2 (HD4) is added to the old RAID group, the data in the old RAID organization can be converted into the data in the new RAID organization relatively quickly.

To effect the fast conversion process, it is required that the management data MD is stored in a fast accessible memory (the cache memory 3 in this embodiment). However, the fast accessible memory is usually a volatile memory. Accordingly, when a power failure occurs, the management data MD is lost. If the management data MD is lost, the conversion process can not be resumed, and some of the data in the old RAID organization is lost.

Instead of the volatile cache memory 3, the management data MD may be stored in the flash memory 4. However, in this case, since the management data MD can not be accessed at high speed as described above, the speed of the conversion process is decreased. Further, if the non-volatile memory such as the flash memory 4 with the limited number of writes is used to store the management data MD that is frequently updated, the life of the flash memory 4 is shortened.

Thus, in this embodiment, the management data MD is usually stored and used in the cache memory 3, and the management data MD within the cache memory 3 is saved to the flash memory 4 at a predetermined timing. Accordingly, even when a power failure occurs, the conversion process can be resumed using the management data MD within the flash memory 4.

In this embodiment, the newest last address Pe and initial address Ps are saved in the flash memory 4 at the predetermined timing when the newest last address Pe is matched with the initial address Ps stored in the flash memory 4. That the management data MD within the flash memory 4 is updated at every predetermined timing in this embodiment.

Accordingly, the frequency at which the management data MD within the flash memory 4 is updated is much smaller than the frequency at which the management data MD within the cache memory 3 is updated. For example, the management data MD within the flash memory 4 can be updated at a rate of several hundredths to several ten thousandths of the update frequency of the management data MD within the cache memory 3. Thereby, even if the management data MD required for resuming the conversion process is periodically backed up within the non-volatile memory (the flash memory 4 in this embodiment), the influence due to the degraded performance of the conversion process can be substantially excluded.

In this embodiment, when the last address Pe within the cache memory 3 is matched with the initial address Ps within the flash memory 4, the last address Pe and the initial address Ps within the flash memory 4 are updated, as described above. This is because the conversion process can be resumed by using the data stored in the free area A3 without losing the user data until the newest address Pe catches up with the initial address Ps saved in the flash memory 4. Its scheme will be described later in FIG. 6.

In this embodiment, the check part 7 checks to see whether or not the data within the conversion area A2 is correct before resuming the conversion process. And if it is determined that the data is wrong, the restoration part 8 restores the data using the data within the free area A3. Accordingly, even when the user data UD1 read into the cache memory 3 is lost due to a power failure before writing it into the disk drive 2, the correct conversion process can be resumed.

In this embodiment, the overwrite confirmation part 5C confirms whether or not the data to be overwritten with the data in the new RAID organization is de-staged before writing the data in the new RAID organization into the free area A3.

Herein, the de-stage refers to writing the data within the cache memory 3 into the disk drive 2. The staging refers to transferring the data within the disk drive 2 to the cache memory 3. The de-staged data is preserved in the disk drive 2 and can be erased from the cache memory 3. In this embodiment, the state of de-staged data is called a clean state. On the contrary, the data that is not de-staged is the data that exists on the cache memory 3 only, and is completely lost if it is erased from the cache memory 3. In this embodiment, the state of data that is not de-staged is called a dirty state.

In this embodiment, if the data to be overwritten within the free area A3 is in the clean state (de-staged), the data in the new RAID organization is written into the free area A3. In other words, if the data to be overwritten within the free area A3 is in the dirty state, the copy from the unconverted area A1 to the free area A3 is stopped until the data becomes in the clean state. Thereby, the data within the free area A3 can be protected until the data within the converted area A2 is written into the disk drive 2. Accordingly, the error data in the conversion area A2 can be restored using the data within the free area A3.

Though the flash memory 4 is employed as the second memory for saving the management data MD, the disk drive 2 or the like for storing the system information may be used instead as the second memory.

Example 1

Figure 2:
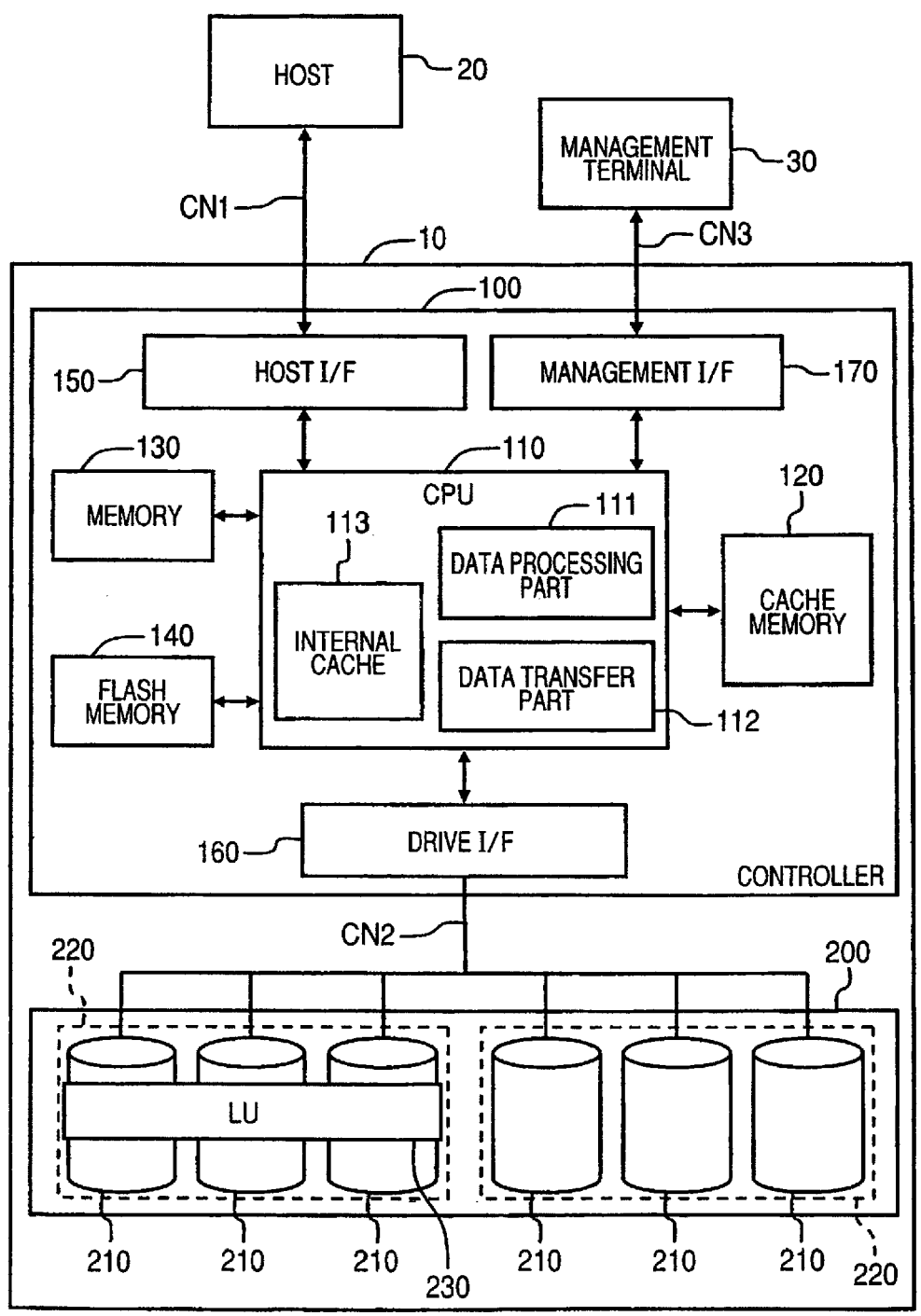
FIG. 2 is an overall configuration view of a storage system.

FIG. 2 is an explanatory view showing the overall configuration of a system in this example. This system comprises a storage control system 10, a host 20, and a management terminal 30, for example. The storage control system 10 comprises a controller 100 and a storage device mounting part 200. The storage device mounting part 200 is also called an HDU (Hard Disk Unit).

The correspondence with FIG. 1 will be described below. The controller 100 corresponds to the storage control device 1, a disk drive 210 within the HDU 200 corresponds to the disk drive 2, a cache memory 120 corresponds to the cache memory 3, and a flash memory 140 corresponds to the flash memory 4. The conversion part 5, the address management part 6, the check part 7, and the restoration part 8 as shown in FIG. 1 are realized by a CPU 110 within the controller 100.

The configuration of a communication network will be described below. The host 20 and the controller 100 are connected via a communication path $CN_1$ for the mutual communication. The controller 100 and the storage device mounting part 200 are communicably connected each other via the communication path CN2. Each of the communication paths CN1 and CN2 is configured as an IP_SAN using the IP (Internet Protocol) or an FC_SAN using the FCP (Fibre Channel Protocol).

The management terminal 30 is connected to the controller 100 via a communication network CN3 such as LAN (Local Area Network). The management terminal 30 collects information on various kinds of states within the controller 100 and displays them on a terminal screen. Also, the management terminal 30 can issue various kinds of instruction to the controller 100 to change the settings.

The host 20 is a personal computer, a server computer, a workstation, or a main frame computer, for example. The host 20 uses a logical volume 230 within the HDU 200 via the controller 100.

The controller 100 controls the data delivery between the host 20 and each disk drive 210. Also, the controller 100 changes the organization or the like of a RAID group 220 in accordance with an instruction from the host 20 or the management terminal 30.

The controller 100 comprises a CPU (Central Processing Unit) 110, the cache memory 120, a memory 130, the flash memory 140, a host interface 150, a drive interface 160 and a management interface 170, for example.

The configuration of the storage control system 10 or the controller 100 is not limited to the illustrated example. For example, the storage control system 10 can mount a plurality of controllers 100. It is possible to distribute the processing load or improve the failure tolerance by providing the plurality of controllers 100.

The CPU 110 controls the operation of the controller 100. The CPU 110 reads a computer program stored in the memory 130 and executes it to implement each process as will be described later. The CPU 110 comprises a data processing part 111, a data transfer part 112 and an internal cache 113, for example.

The data processing part 1111 processes a command received from the host 20, and returns the processing result to the host 20, for example. Further, the data processing part 111 converts the address of the data in the old RAID organization into the address of the data in the new RAID organization, or calculates the parity based on the new RAID organization. The data processing part 111 adds a guarantee code of 8 bytes including the logical address or LRC to the data of 512 bytes (data of one stripe). The data processing part 111 determines whether or not the data read target is correct based on the guarantee code.

The data transfer part 112 controls the data transfer between the cache memory 120 and each predetermined part, for example. Each predetermined part is the flash memory 140, the host interface 150, the drive interface 160, or the management interface 170, for example.

The data transfer part 112 may be configured as a data transfer dedicated circuit. Similarly, at least a part of each process performed by the data transfer part 111 may be realized as a dedicated hardware circuit.

The cache memory 120 stores the data (write data) received from the host 20 or the data read from the disk drive 210. The cache memory 120 is a volatile memory. The cache memory 120 also stores a management table T10 used to convert the old RAID group into the new RAID group. The memory 130 stores various kinds of computer program executed on the CPU 110.

The flash memory 140 stores at least a part of the storage content of the management table T10 stored in the cache memory 120 at a predetermined timing. The flash memory 140 is a non-volatile memory. Accordingly, even if a power failure occurs and power supply to the controller is stopped, the contents stored in the flash memory 140 are not lost.

The host interface 150 makes the communication with the host 20. The drive interface 160 makes the communication with the disk drive 210. The management interface 170 makes the communication with the management terminal 30.

The HDU 200 has a plurality of disk drives 210. For the sake of convenience, the "disk drive" is used in this example, but not limited to the device using the disk-like storage medium. The disk drive 210 may be various kinds of storage device capable of reading and writing the data, such as a hard disk drive, a semiconductor memory device, an optical disk device, a magneto-optical disk device, a magnetic tape device or a flexible disk device, for example. When the hard disk device is used, FC (Fibre Channel) disk, SCSI (Small Computer System Interface) disk, SATA disk, ATA (AT Attachment) disk, or SAS (Serial Attached SCSI) disk, for example, may be used.

When the semiconductor memory device is used, various kinds of memory device such as flash memory device, FeRAM (Ferroelectric Random Access Memory), MRAM (Magentoresisive Random Access Memory), a phase change memory (Ovonic Unified Memory), or RRAM (Resistance RAM), for example, may be used.

The RAID group 220 can be configured by grouping the plurality of disk drives 210. One or more logical volumes 230 can be generated using the storage areas of the RAID group 220. The logical volume 230 is associated with a communication port that the host interface 150 has, and provided to the host 20. The host 20 can read or write the data from or into the logical volume 230 by issuing a read command or write command with the logical address designated.

FIG. 3 is an explanatory view showing one example of the management table T10 used to extend the RAID group 220. The management table T10 comprises a group number column C10, a state column C11, an old RAID organization column C12, a new RAID organization column C13, a converted address column C14, an unconverted address column C15 and the other column C16, for example.

The management table T10 is stored in the cache memory 120, and used by the CPU 110. Further, at least a part of the management table T10 is also copied to the flash memory 140 at a predetermined timing. For example, the information on the RAID group of which an extension process is performed is also copied to the flash memory 140.

The group number column C10 manages the RAID group number (RG#) for identifying each RAID group 20 under the control of the controller 100. The state column C11 manages whether or not the RAID group is during extension. When the RAID group 220 is extended, "implemented" is set. When the RAID group 220 is not extended, "unimplemented" is set.

The old RAID organization column C12 denotes the old RAID organization of the RAID group 220 subjected to the extension process. The new RAID organization column C12 denotes the new RAID organization of the RAID group 220 subjected to the extension process. For the RAID group number not subjected to the RAID group extension process, the old RAID organization only is set, but the new RAID organization is not set.

The RAID organization has the organization information such as 4D+1P, 4D+4D or 6D+2P at each RAID level of RAID0 to RAID6. Herein, 4D+1P is the RAID organization having four data drives for storing the data and one parity drive for storing the parity. For example, the RAID level using one kind of parity such as RAID5 may be used. 4D+4D is the mirroring (RAID1) composed of four data drives and another four data drives. 6D+2P is the RAID6 composed of four data drives and two parity drives.

The converted address column C14 stores the last address Pe of the converted area A2. The unconverted address column C15 stores the initial address Ps of the unconverted area A1. The other column C16 stores the other information. The other information includes the type of disk drive 210 making up the RAID group, the total storage capacity of the RAID group, the unused storage amount of the RAID group, the used storage amount of the RAID group and a drive list indicating the identification information of each disk drive 210 making up the RAID group.

Figure 4:
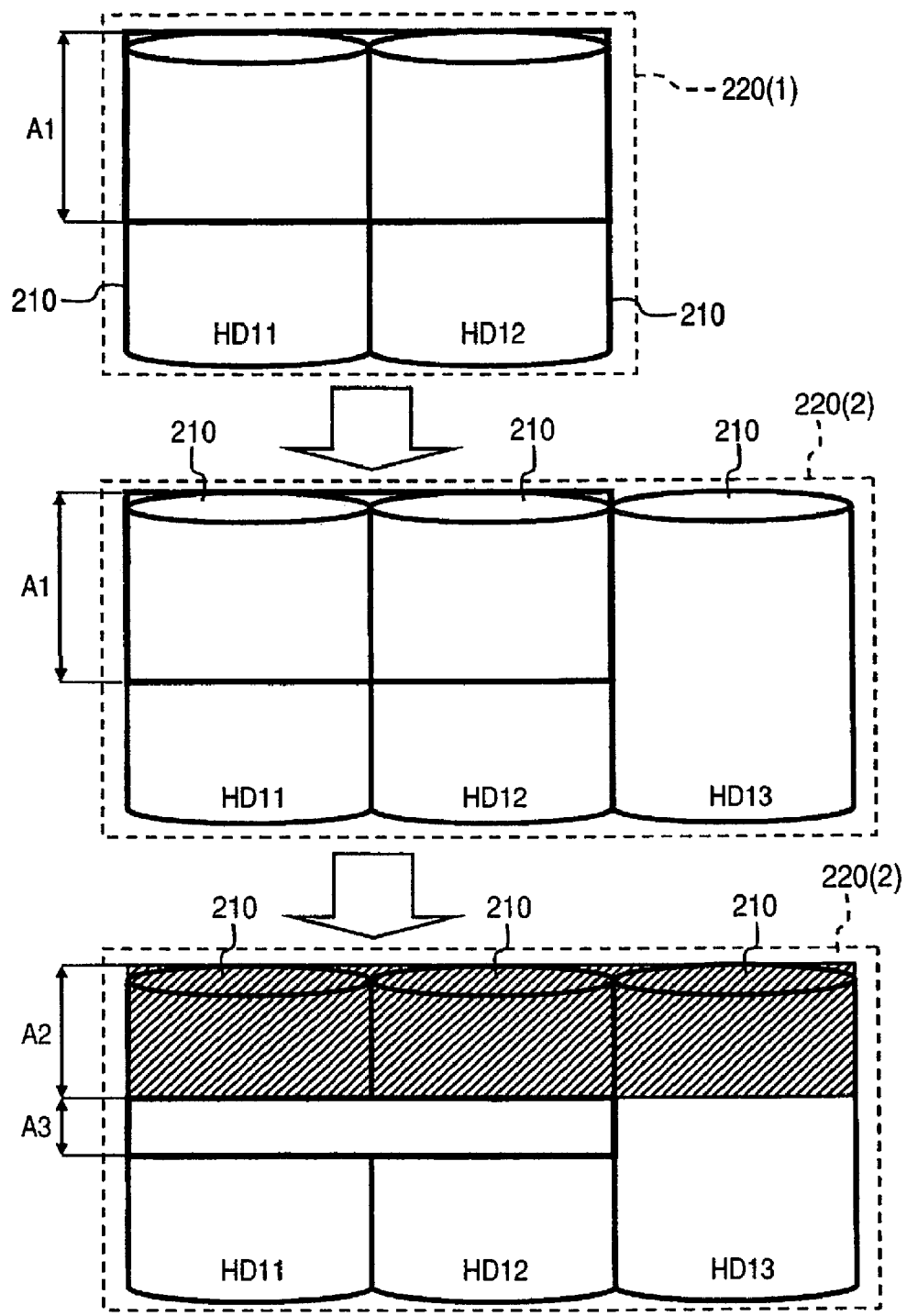
FIG. 4 is an explanatory view showing the extension of the RAID group in simplified form.

FIG. 4 shows how to extend the RAID group by adding the new disk drive 210 (HD13) to the old RAID group. Herein, the RAID group after extending the storage capacity is called the new RAID group.

The old RAID group 220 (1) at the upper stage of FIG. 4 is composed of two disk drives 210 (HD11) and 220 (HD12). The new. RAID group 220 (2) is generated by adding one new disk drive 210 (HD13) to the old RAID group 220 (1) as shown at the middle stage in FIG. 4.

The data is already stored in the storage area A1 of each disk drive 210 (HD11), 210 (HD12) making up the old RAID group 220 (1). The storage area A1 stores the data not converted into the data in the new RAID organization. Accordingly, the storage area A1 is called the unconverted area. Because of the addition of the new disk drive 210 (HD13), the storage area of the RAID group is increased by one disk drive. The existent data stored in the area A1 is rearranged in the extended storage area.

If the conversion process from the old RAID group 220 (1) to the new RAID group 220 (2) is completed, the converted area A2 and the free area A3 exist in the storage area of the new RAID group 220 (2), as shown at the lower stage in FIG. 4. The converted area A2 is the area for storing the data with the address reset as the data in the new RAID organization. The free area A3 is the storage area based on the old RAID organization, where the same data exists in the converted area A2.

Figure 5:
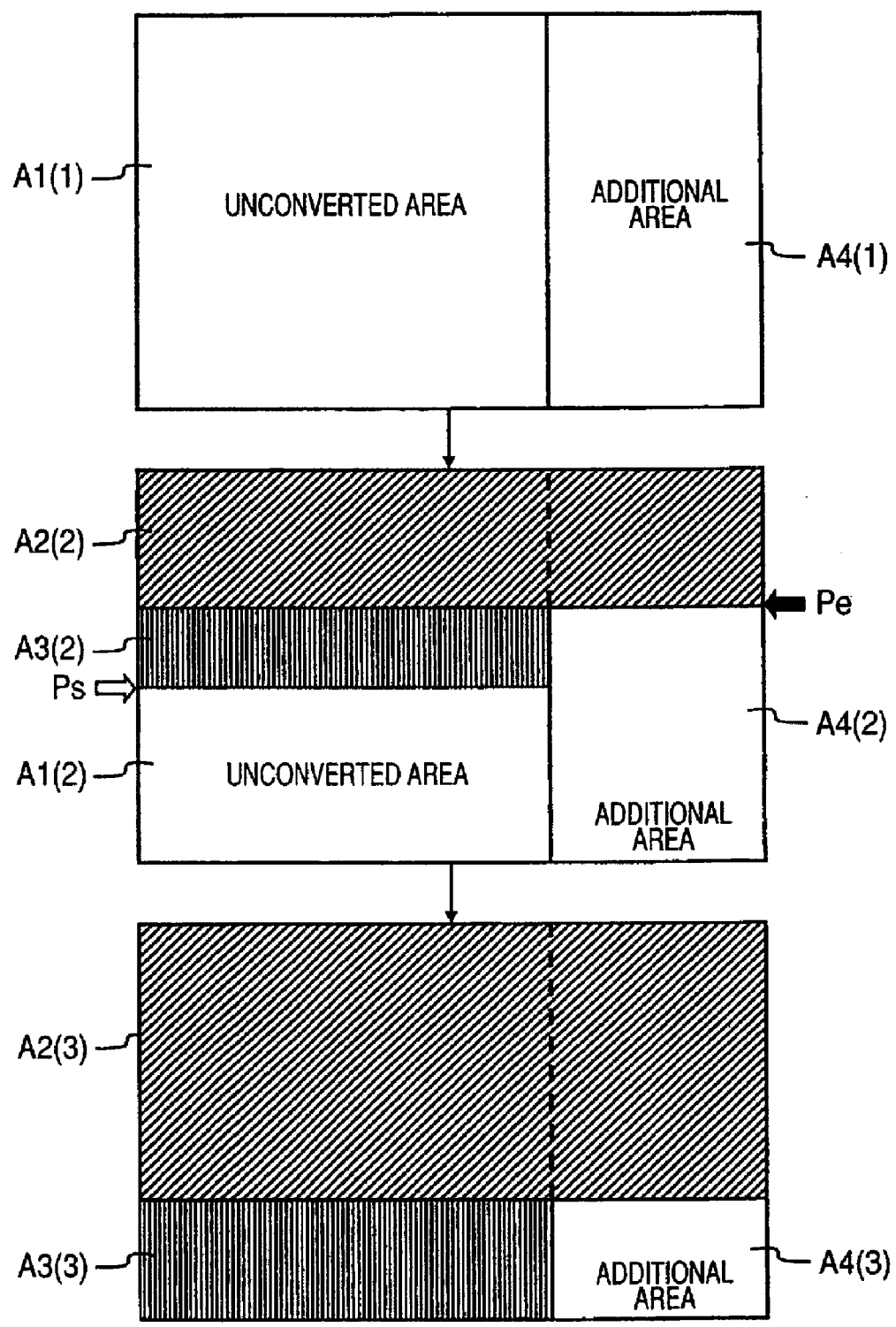
FIG. 5 is an explanatory view showing a plurality of areas having different attributes formed in a storage area of the RAID group.

FIG. 5 is an explanatory view typically showing how to make the conversion from the old RAID group to the new RAID group. A new storage area A4 (1) is added to the unconverted area A1 (1), as shown at the upper stage in FIG. 5. And the conversion process is started.

The middle stage of FIG. 5 shows a state in which the conversion process advances only part way. The converted area A2 (2) from the initial address to the last address Pe of the storage area of the RAID group stores the data converted in accordance with the new RAID organization.

The free area A3 (2) from the end Pe to the address Ps of the converted area A2 stores the data before completion of re-striping for the data for which the re-striping is completed. The unconverted area A1 (2) exists after the free area A3 (2). The data taken out of the unconverted area A1 (2) is converted into the data in the new RAID organization, and written into the free area A3 (2). A portion of the unconverted area A1 (2) having the converted data belongs to the free area A3 (2). A portion of the free area A3 (2), into which the data in the new RAID organization is written, belongs to the converted area A2 (2).

The data in the old RAID organization is all converted into the data in the new RAID organization and rearranged in order from the top of the storage area of the new RAID group, as shown at the lower stage in FIG. 5. The size of the converted area A2 (3) and the size of the unconverted area A1 (1) before conversion are equal. The total value of the size of the free area A3 (3) and the size of the additional area A4 (3) is equal to the size of the additional area A4 (1).

Figure 6:
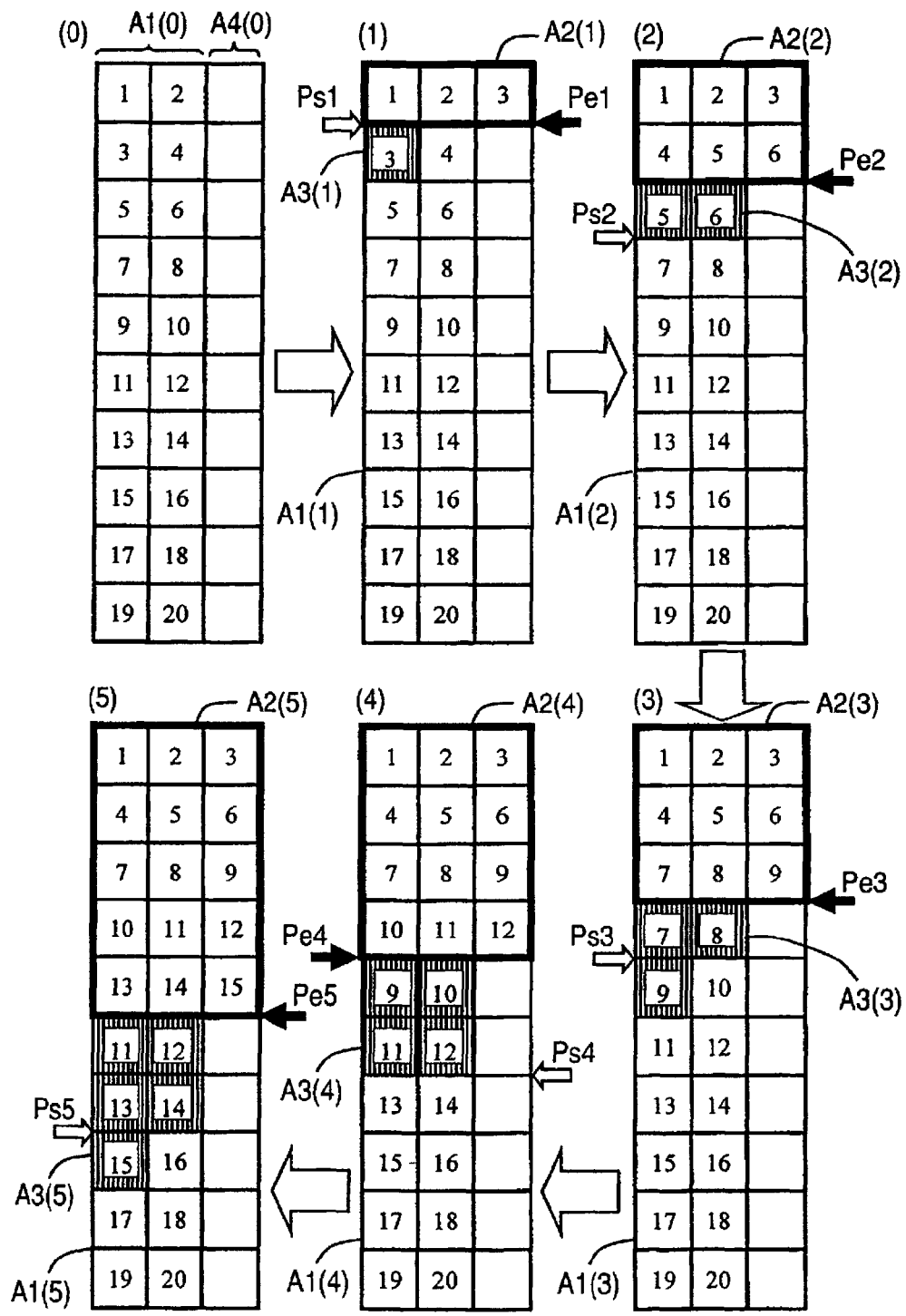
FIG. 6 is an explanatory view showing how to extend the RAID group by converting and rearranging the data in the old RAID organization into the data in the new RAID organization.

FIG. 6 is an explanatory view showing the conversion process in detail. In FIG. 6, for the sake of convenience, a relatively simple configuration example is explained. The unconverted area A1 (0) before starting the conversion process is composed of the storage areas of two disk drives, as shown in FIG. 6 (0). The storage area of one disk drive is shown in the block of one vertical column. The conversion process (extension process for the RAID group) is started by adding the storage area A4 (0) of the new disk drive to the unconverted area A1 (0).

The data (data from address "1" to address "3") making up one stripe row of the new RAID group is read from the unconverted area A1 (1), and written in order from the initial address of the new RAID group, as shown in FIG. 6 (1). Thereby, the converted area A2 (1) is formed in the top part of the new RAID group. Since the data based on the new RAID organization (hereinafter referred to as the converted data) is written, the free area A3 also occurs. The free area A3 (1) stores the data of the address "3". The data of the address "3" is stored in both the converted area A2 (1) and the free area A3 (1).

The data making up the next one stripe row (data from the address "4" to the address "6") is read from the unconverted area A1 (1) and written into the storage area of the new RAID group, as shown in FIG. 6 (2). Two stripe rows are written, so that the data of the address "3" as shown in FIG. 6 (1) exists only within the converted area A2 (2). The stripe row from the address "4" to the address "6" is newly written, so that the data of the address "5" and the data of the address "6" are included in the free area A3 (2).

Similarly, the data is read consecutively from the unconverted area A1, and written consecutively into the free area A3, as shown in FIG. 6 (3) to FIG. 6 (5). More correctly, the converted data is written into the free area A3 and the newly added area A4.

The last address Pe of the converted area A2 and the initial address Ps of the unconverted area A1 change every moment along with the progress of the conversion process. The management table T10 within the cache memory 120 is updated along with the progress of the conversion process.

Further, if the initial address Ps stored in the flash memory 140 and the newest last address Pe are matched, the newest initial address Ps and the newest last address Pe are saved into the flash memory 140.

Referring to FIGS. 7 to 15, the action of this example will be described below. Each flowchart in the following shows the outline of each process, and is different from the actual computer program. It will be appreciated to those skilled in the art that the steps as shown in the figures may be exchanged, changed or deleted and the new steps may be added.

Figure 7:
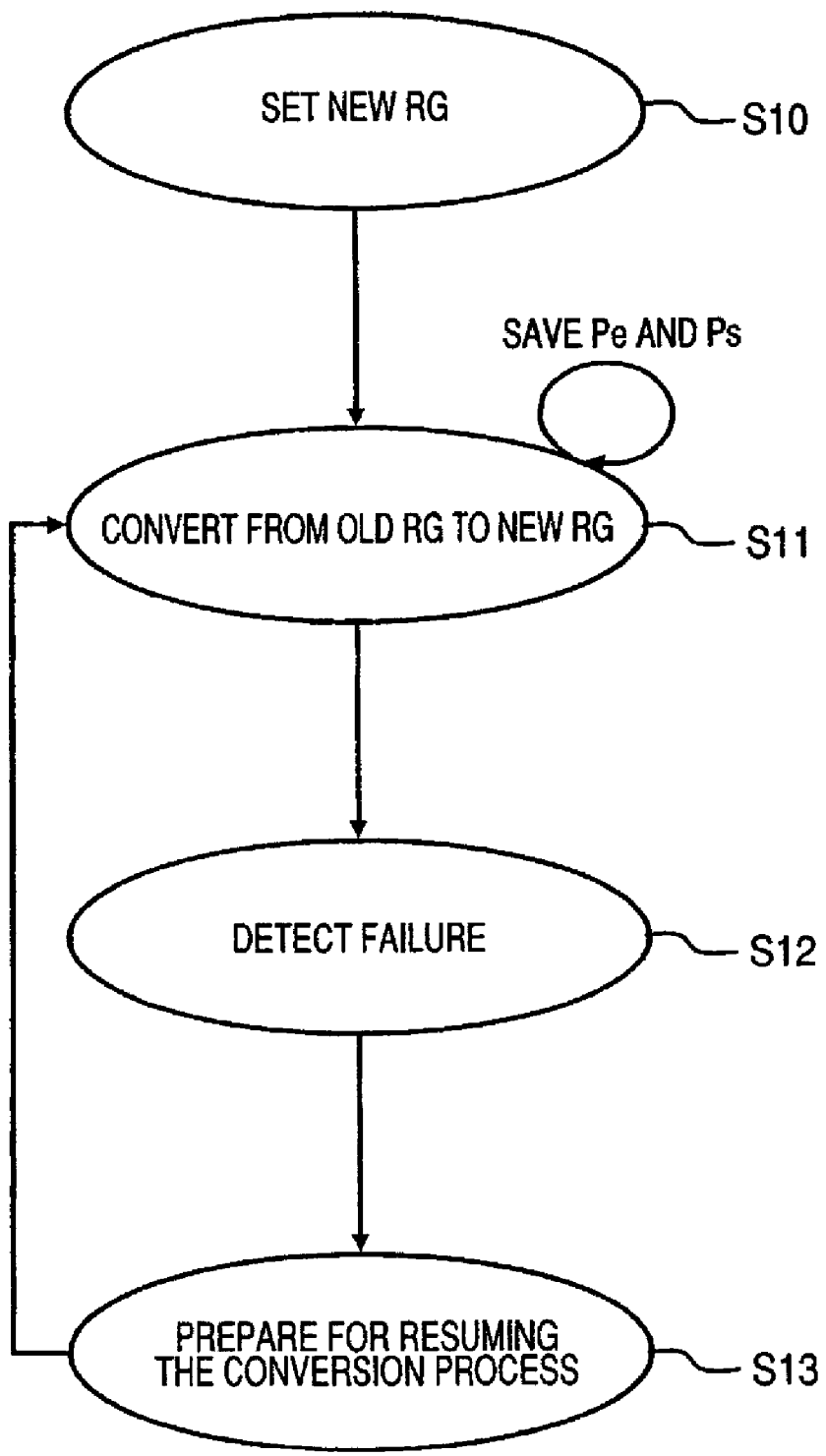
FIG. 7 is an explanatory view showing the overall operation of the storage system.

FIG. 7 is an explanatory view typically showing the overall operation. First of all, the user sets the new RAID group by adding the new disk drive 210 to the HDU 200 or designating the RAID group number or RAID level of extension object (S10). If there is an excess disk drive 210 within the HDU 200, the disk drive 210 may be used. A setting process for the new RAID group will be described below in detail with reference to FIG. 8.

After the end of setting the new RAID group, the controller 100 starts the conversion process from the old RAID group to the new RAID group (S11). The controller 100 reads the data in the old RAID organization, converts it into the address according to the new RAID organization, and writes it into the storage area of the new RAID group. At a predetermined timing in the middle of the conversion process, the last address Pe of the converted area A2 and the initial address Ps of the unconverted area are saved into the flash memory 140. The details of the conversion process will be described later with reference to FIGS. 10 and 11.

A failure such as a power failure may occur before the conversion process is completed. The controller 100 detects the failure (S12). The failure is a trouble having significant influence on the conversion process, in which the storage content (table T10 or user data) of the cache memory 120 may be lost due to a power failure, for example. The controller 100 may find the occurrence of failure or the user may notify the occurrence of failure from the management terminal 30 to the controller 100. A failure detection process will be described later with reference to FIG. 12.

If the failure is detected, the controller 100 makes preparations for resuming the conversion process (S13), and the operation returns to S11. The details of the process for making preparations for resuming the conversion process will be described later with reference to FIG. 13. And the conversion process to be resumed will be described later with reference to FIG. 14.

Figure 8:
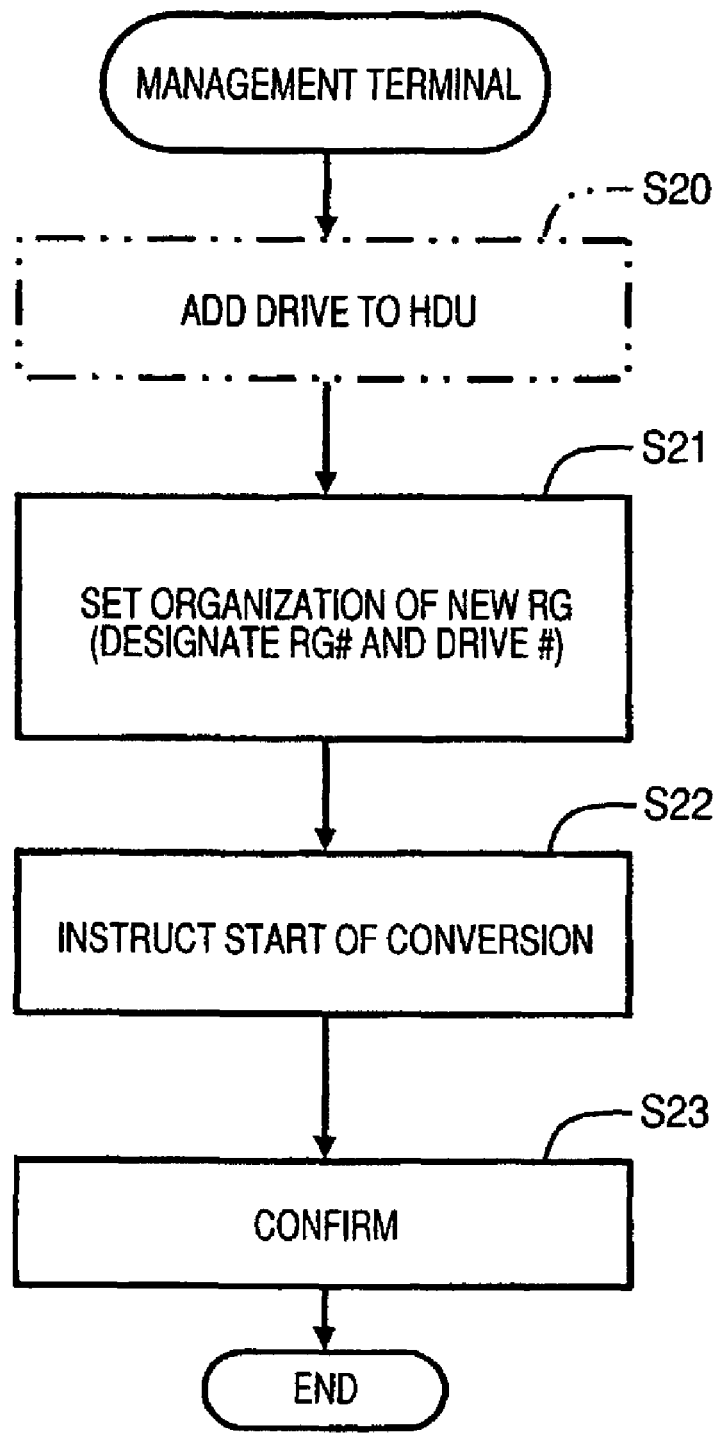
FIG. 8 is a flowchart showing a process for setting the new RAID group.

FIG. 8 is a flowchart showing a process for setting the new RAID group. The user adds the new disk drive 210 to the HDU 200 (S20). If there is an unused spare disk drive within the HDU 200, it can be used.

The user sets the organization of the new RAID group using the management terminal 30 (S21). For example, the user designates the RAID group number of extension object and the disk drive number to be added to the RAID group of extension object.

The user instructs the controller 100 to start the conversion process (extension process for the RAID group) using the management terminal 30 (S22). If the process of the controller 100 is completed, the controller 100 sends a completion notice to the management terminal 30 (S45 in FIG. 11). The user confirms that the extension of the RAID group is completed from the completion notice (S23).

Figure 9:
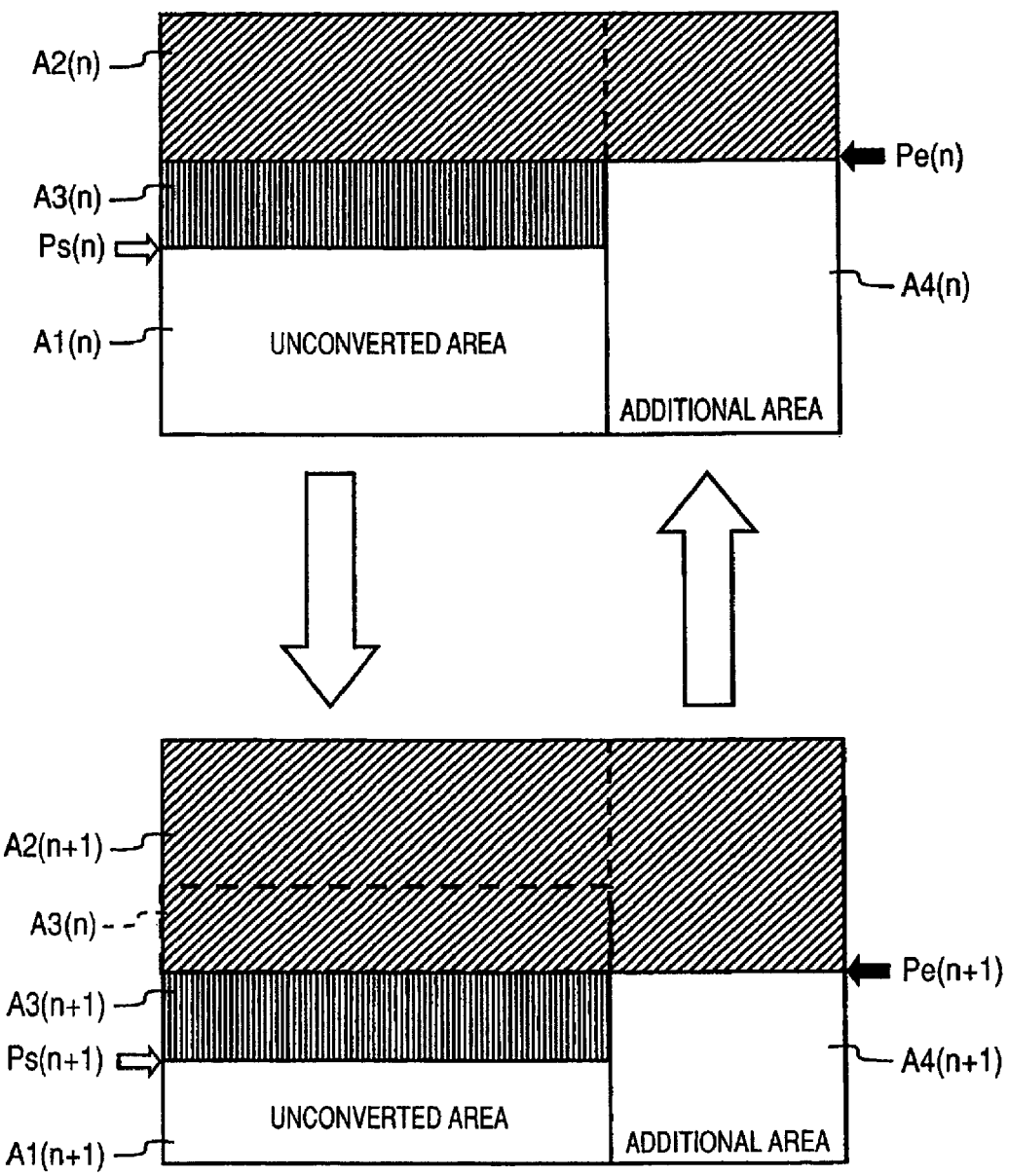

FIG. 9 is an explanatory view showing each address Ps, Pe for use to resume the conversion process. The upper stage of FIG. 9 shows the last address Pe (n) and the initial address Ps (n) saved into the flash memory 140.

The lower stage of FIG. 9 shows a state where the conversion process advances. The converted area A2 is extended from A2 (n) to A2 (n+1). In accordance with the extension, the unconverted area A1 is shrunken from A1 (n) to A1 (n+1). The last address Pe advances from Pe (n) to Pe (n+1), and the initial address Ps changes from Ps (n) to Ps (n+1).

After the conversion process is performed up to the state as shown at the lower stage in FIG. 9, if a power failure occurs, the conversion process is performed again, using the last address Pe (n) and the initial address Ps (n) saved in the flash memory 140. The conversion process is resumed from the state as shown at the upper stage in FIG. 9.

That is, the controller 100 can know the position to resume by periodically saving the last address Pe of the converted area A2 and the initial address Ps of the unconverted area A1 into the flash memory 140.

The lower stage of FIG. 9 shows an instance where the last address Pe (n+1) is matched with the initial address Ps (n) at the time of saving. The controller 100 saves the newest last address Pe (n+1) and the newest initial address Ps (n+1) into the flash memory 140, when Pe (n+1)=Ps (n). Thereby, the controller 100 can resume the conversion process using the data stored in the free area A3 when the failure occurs.

Figure 10:
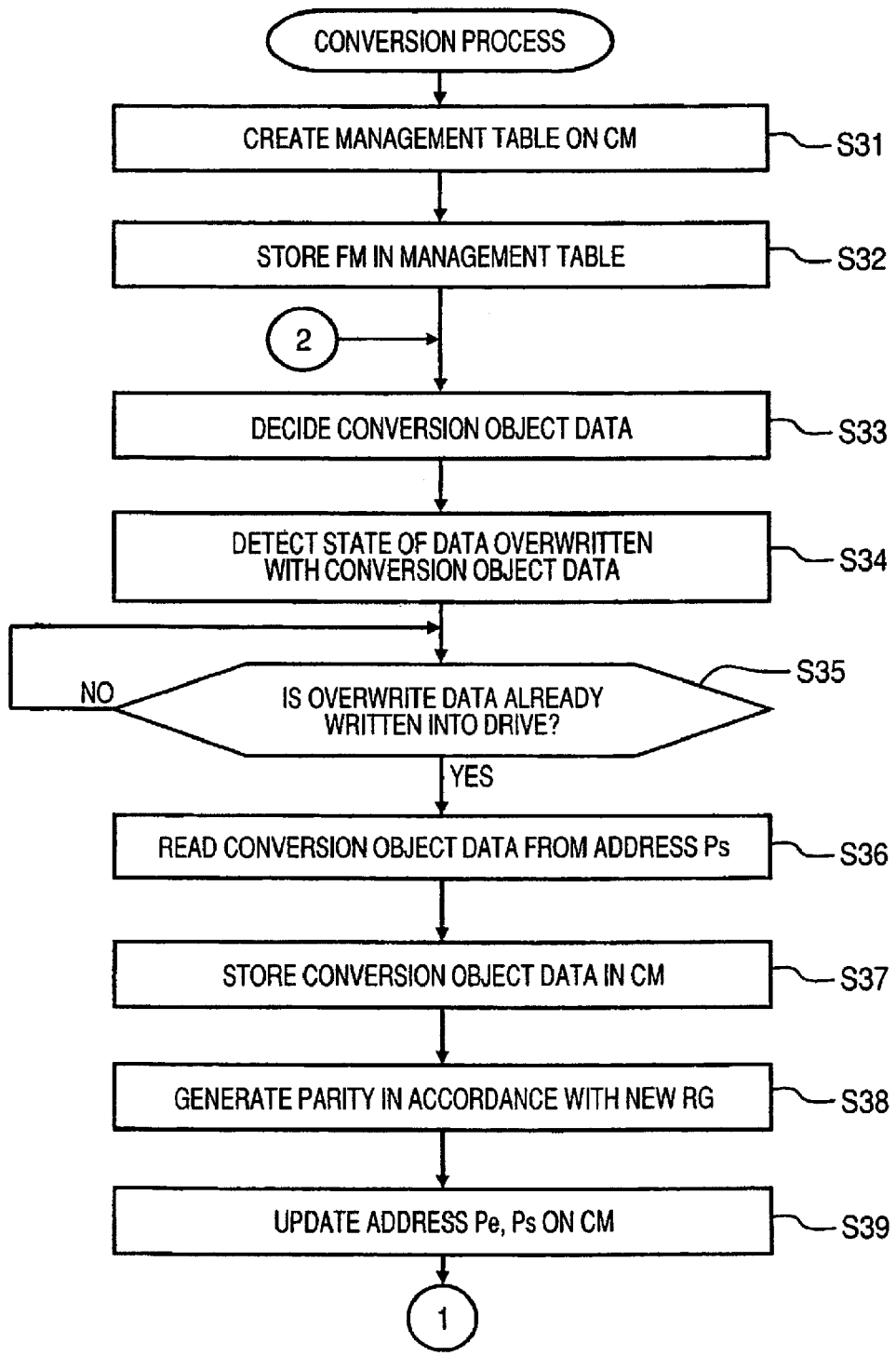
FIG. 10 is a flowchart showing the conversion process.
Figure 11:
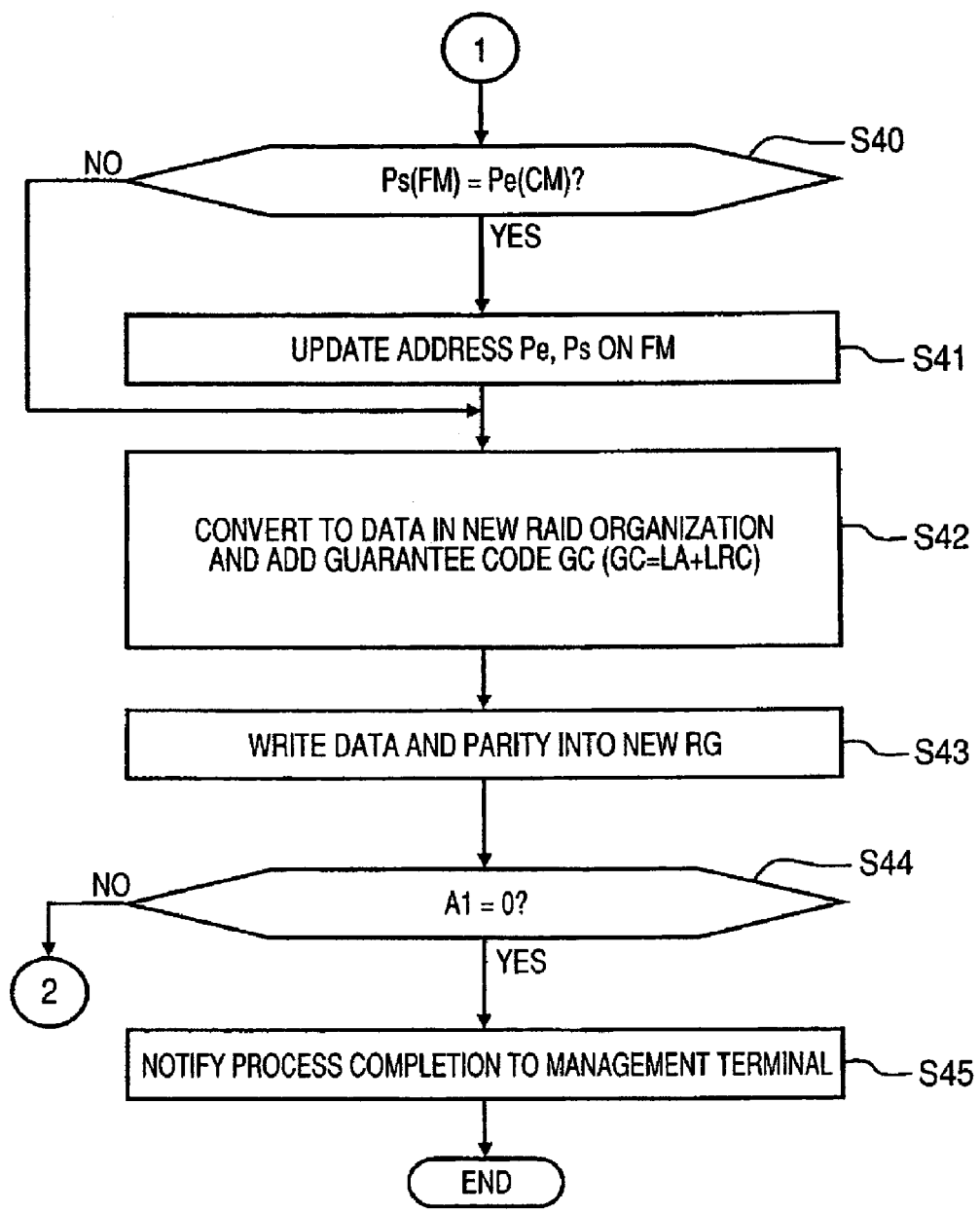
FIG. 11 is a flowchart continued from FIG. 10.

FIGS. 10 and 11 are flowcharts showing the conversion process. The controller 100 creates the management table T10 on the cache memory 120 (S31). The controller 100 transfers and stores the management table T10 in the flash memory 140 (S32).

The management table T10 is also stored in the flash memory 140 at the time of starting the conversion process, whereby even if a power failure occurs immediately after, the controller 100 can know for which RAID group and how the extension is made.

The controller 100 decides the data of conversion object (S33). The controller 100 detects the state of data to be overwritten with the conversion object data (S34). The controller 100 determines whether or not the data to be overwritten is in the clean state (S35). If the data to be overwritten with the re-striping data is in the dirty state (S35: NO), the controller 100 waits until the data to be overwritten becomes in the clean state.

If the data to be overwritten is in the clean state (S35: YES), the controller 100 reads a predetermined amount of conversion object data from the initial address Ps (S36), and stores it in the cache memory 120 (S37).

The controller 100 generates the new parity in accordance with the new RAID organization (S38). The controller 100 increases the value of each address Pe, Ps stored in the management table T10 within the cache memory 120 by the predetermined amount read at S36 (S39).

Transferring to FIG. 11, the controller 100 determines whether or not the initial address Ps (FM) stored in the flash memory 140 and the last address Pe (CM) stored in the cache memory 120 are matched (S40).

If the initial address Ps (FM) and the last address Pe (CM) are matched (S40: YES), the controller 100 updates each address Pe, PS stored in the flash memory 140 with the newest value (S41). If the initial address Ps (FM) and the last address Pe (CM) are unmatched (S40: NO), it is not required that each address Pe, Ps is saved into the flash memory 140, whereby the step S41 is skipped.

The controller 100 converts the address of the data of conversion object read at S36 into the address in accordance with the new RAID organization, and further adds the guarantee code GC (S42). The guarantee code GC includes the address information (LA) indicating the target storage address of data and the LRC. The guarantee code GC is formed in 8 bytes, and added to the data in units of 512 bytes. Accordingly, the logical block with the guarantee code GC added has 520 bytes.

The controller 100 writes the data and parity with the guarantee code added into the storage area of the new RAID group (S43). That is, the data based on the new RAID organization is written into stripe rows over the free area A3 and the additional area A4.

The controller 100 determines whether or not the unconverted area A1 disappears (S44). If the conversion of all the unconverted data within the unconverted area A1 into the data in the new RAID organization is ended (S44: YES), the controller 100 notifies the management terminal 30 that the process is completed (S45). If the unconverted data remains in the unconverted area A1 (S44: NO), the controller 100 returns to S33 in FIG. 10.

Figure 12:
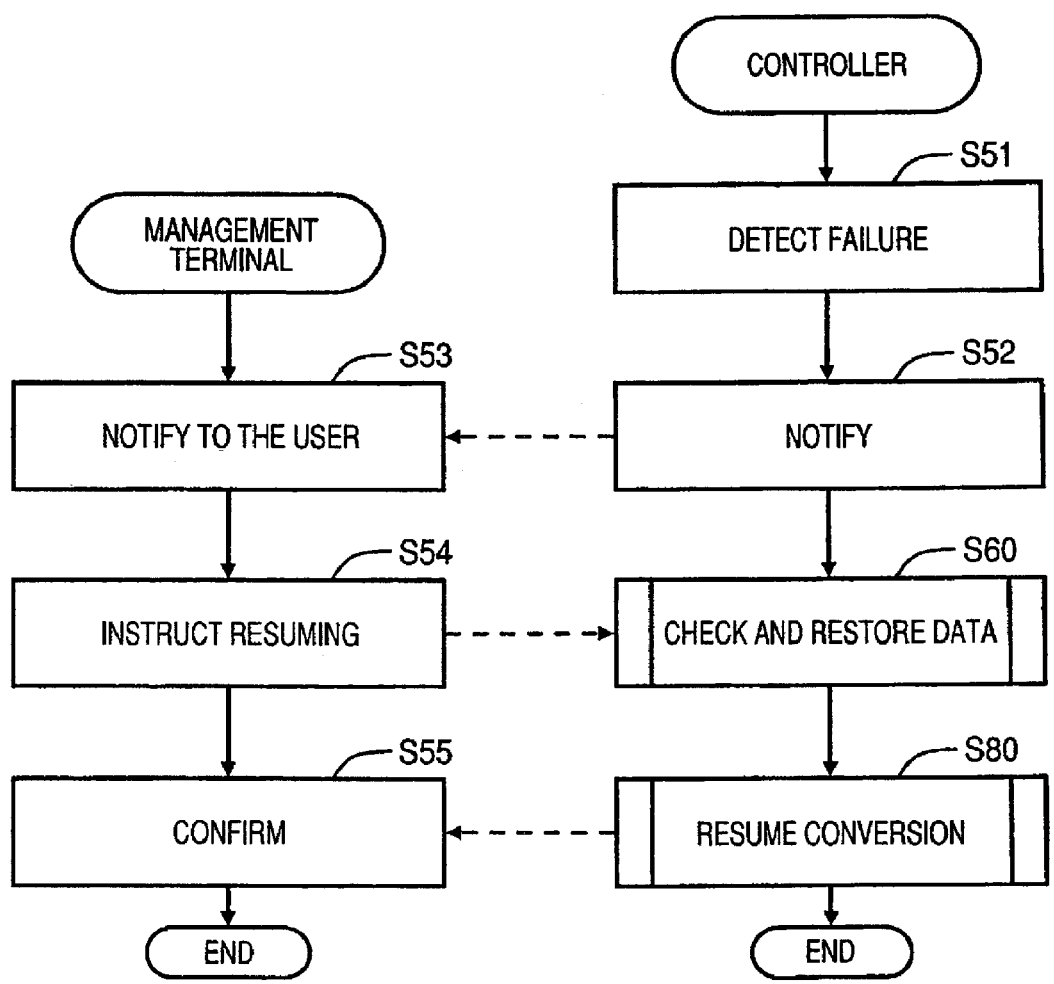
FIG. 12 is a flowchart showing a failure detection process.

FIG. 12 is a flowchart showing a process for detecting the failure. The controller 100 detects the occurrence of failure such as a power failure, for example, in which the storage content of the cache memory 120 is lost (S51), and notifies it to the management terminal 30 (S52).

The management terminal 30 receives a notice from the controller 100, and notifies the user that the failure occurs (S53). For example, the management terminal 30 can notify the occurrence of failure to the user, with a message displayed on the terminal screen or an electronic mail sent to the user. The notice may also indicate that the conversion process is interrupted.

The user, who knows the occurrence of failure, confirms the recovery from the failure and instructs the controller 100 to resume the conversion process that is interrupted (S54). The controller 100 receiving an instruction from the management terminal 30 performs a process for checking and restoring the data (S60), and then resumes the conversion process (S80). The user can confirm that the resumed conversion process is normally ended from a notice sent from the controller 100 to the management terminal 30. The user can know that the conversion process is resumed via the management terminal 30.

Figure 13:
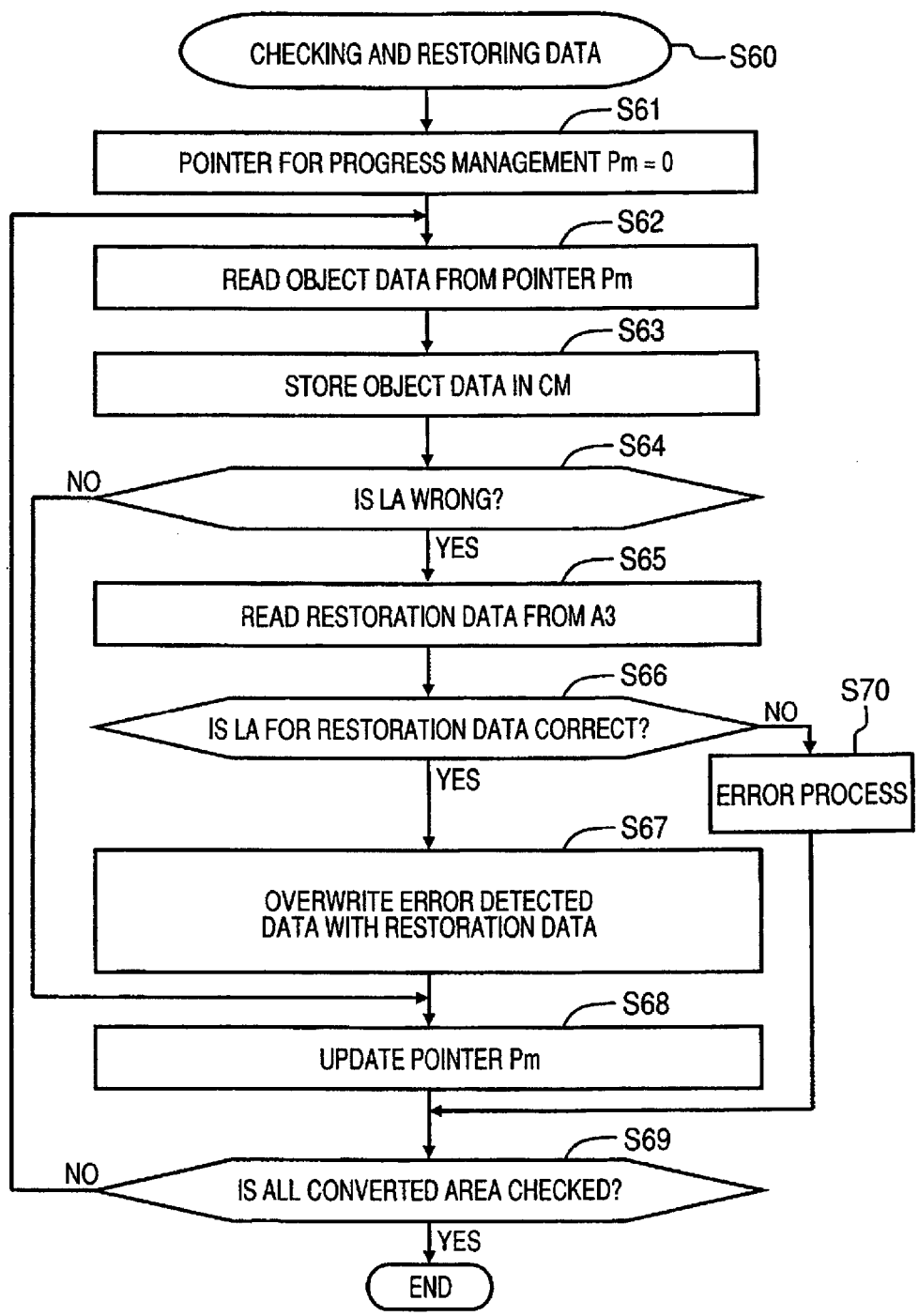
FIG. 13 is a flowchart showing a process for checking and restoring the data.

FIG. 13 is a flowchart showing the process for checking and restoring the data (S60). First of all, the controller 100 initializes a pointer Pm for managing the progress of this process (S61). The pointer Pm is set to the initial address "0" of the storage area in the new RAID group.

The controller 100 reads a predetermined amount of check object data from the converted area A2 (S62), and stores it in the cache memory 120 (S63). The controller 100 checks the address information (LA) added to respective data for each data and determines whether or not the address information is correct (S64). The data read from the converted area A2 should have the address information matched with the logical address of read target. If the address information is wrong (S64: YES), for example, if the converted data within the cache memory 120 is lost due to any failure before it is written into the disk drive 210, the data before conversion remains at the position where the converted data is to be written. In this case, since the address information in the data before conversion is unmatched with the address newly assigned to that position, an error is detected.

If an address error is detected (S64: YES), the controller 100 finds the restoration data from the free area A3, and reads the restoration data (S65). The restoration data is the data to be intrinsically stored at the position where the address error occurs. The data before re-striping in which the re-striping is ended is stored in the free area A3, as described above.

In this example, after the address Pe, Ps is saved into the flash memory 140 at a predetermined timing to allow the data in the free area A3 to be used as the restoration data, and the data to be overwritten with the conversion object data becomes in the clean state, the conversion object data is written into the free area A3, as described above. Accordingly, the controller 100 can find the restoration data from the data stored in the free area A3.

The controller 100 checks the address information added to the restoration data, and determines whether or not the address information is correct (S66). If the address information of the restoration data is correct (566: YES), the controller 100 overwrites the data in which the address error is detected with the restoration data (S67). If the address error is not detected (S64: NO), the controller 100 transfers to S68.

The controller 100 updates the pointer Pm (S68), and determines whether or not all the converted area is checked (S69). If the unchecked data remains (S69: NO), the controller 100 returns to S62. If all the converted area A2 is checked (S69: YES), the controller 100 ends this process.

Since the address information of the restoration data is usually correct, an error process at S70 may be omitted. The reliability can be enhanced by checking the address information of the restoration data.

Figure 14:
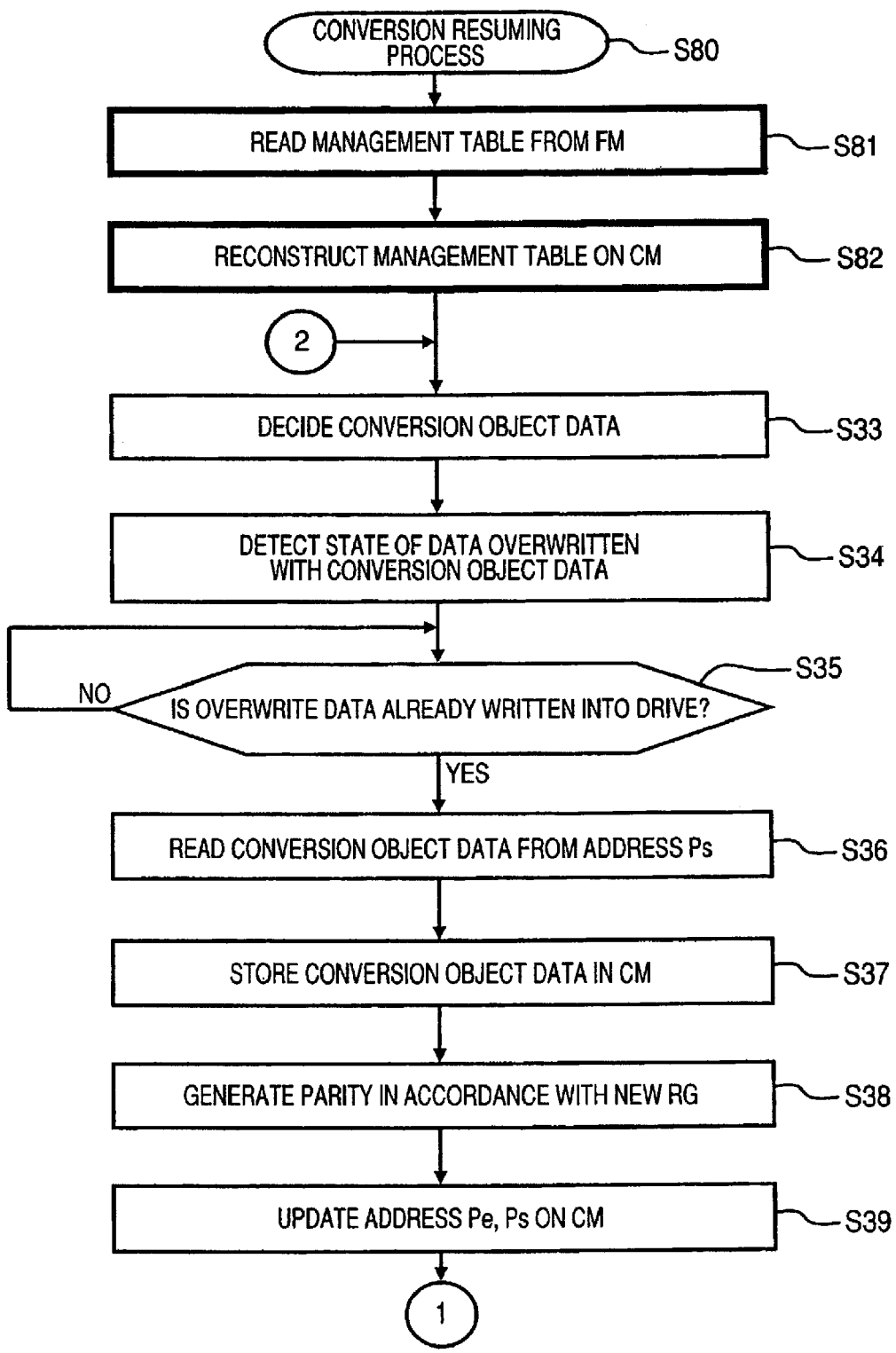
FIG. 14 is a flowchart showing an instance of resuming the conversion process.

FIG. 14 is a flowchart for resuming the conversion process. The controller 100 reads the management table T10 from the flash memory 140 (S81), and reconstructs the management table T10 within the cache memory 120 (S82). Subsequently, the controller 100 performs the conversion process as described with reference to FIGS. 10 and 11.

Figure 15:
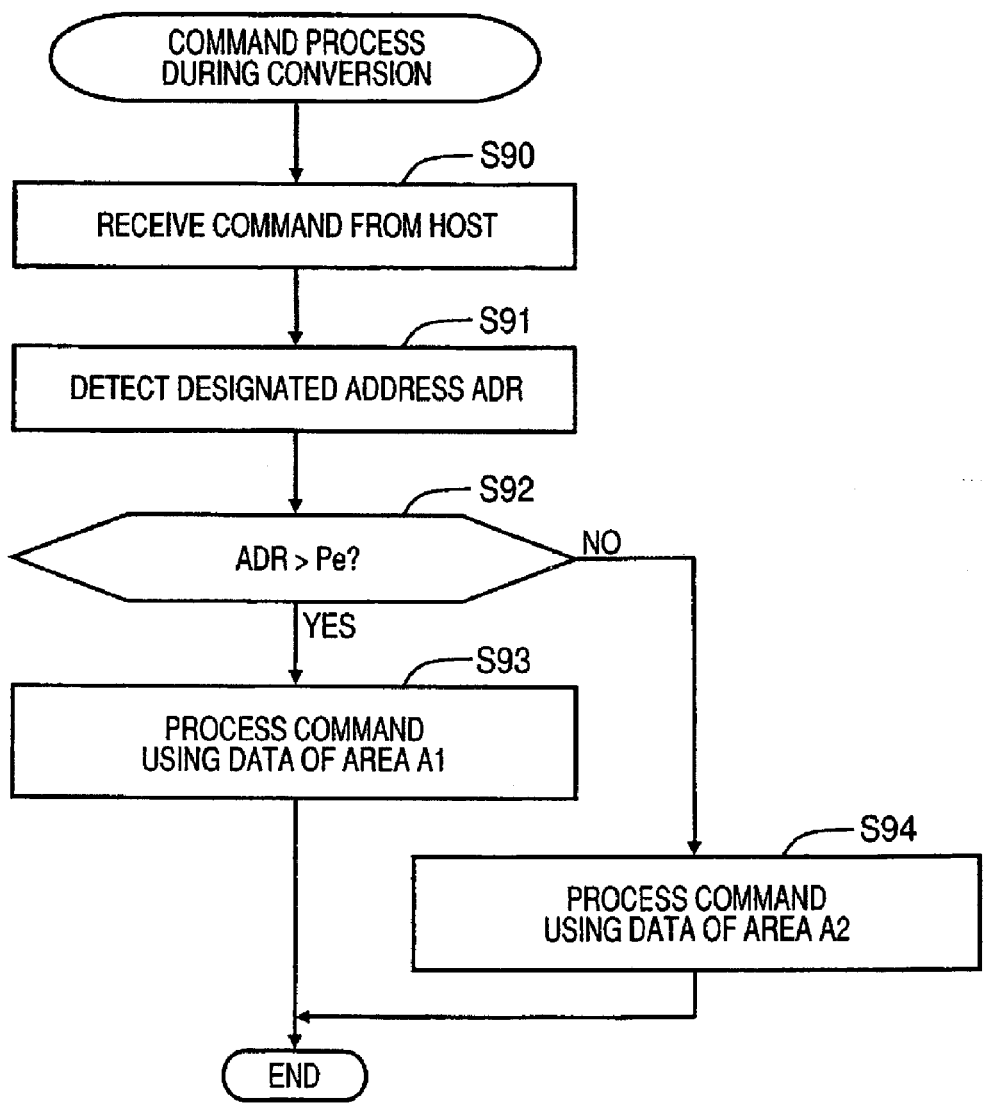
FIG. 15 is a flowchart for processing a command during conversion.

FIG. 15 is a flowchart showing a command process during the conversion process. During the conversion process, the controller 100 receives a write command or read command from the host 20 (S90). The controller 100 detects the logical address ADR specified in the command (S91), and compares the address ADR and the last address Pe of the converted area A2 (S92).

If the address ADR specified in the command is larger than the last address Pe (S92: YES), the controller 100 processes the command received from the host 20, using the data within the unconverted area A1 (S93). On the contrary, if the address ADR specified in the command is the last address Pe or less (S92: NO), the controller 100 processes the command using the data within the converted area A2 (S94). The processing result of the command is transmitted to the host 20 via the host interface 150 and the communication network CN1.

This example achieves the following effects. In this example, the RAID group can be simply extended by adding the disk drive 210 having a required amount for extension to the old RAID group. In this example, since the data transfer (read process) from the disk drive 210 to the cache memory 120 and the data transfer (write process) from the cache memory 120 to the disk drive 210 are performed asynchronously, the conversion process can be performed at higher speed.

In this example, the last address Pe of the converted area A2 and the initial address Ps of the unconverted area A1 are stored in the flash memory 140. Accordingly, even when a failure such as power failure occurs, the interrupted conversion process can be resumed using each address Pe, Ps saved in the flash memory 140.

In this example, if the saved initial address Ps is matched with the newest last address Pe, each newest address Pe, Ps is stored in the flash memory 140. Accordingly, the access frequency to the flash memory 140 can be greatly decreased during the conversion process, thereby suppressing the lower speed of the conversion process.

In this example, it is checked to see whether or not the data within the conversion area A2 is correct before resuming the conversion process, in which the wrong data is restored using the data within the free area A3. Accordingly, the conversion process can be correctly resumed.

In this example, before the data in the new RAID organization is written into the free area A3, it is confirmed whether or not the data to be overwritten is de-staged. Thereby, the data within the free area A3 can be protected until the data within the converted area A2 is written into the disk drive 210. Accordingly, the error within the conversion area A2 can be restored using the data within the free area A3.

Example 2

Figure 16:
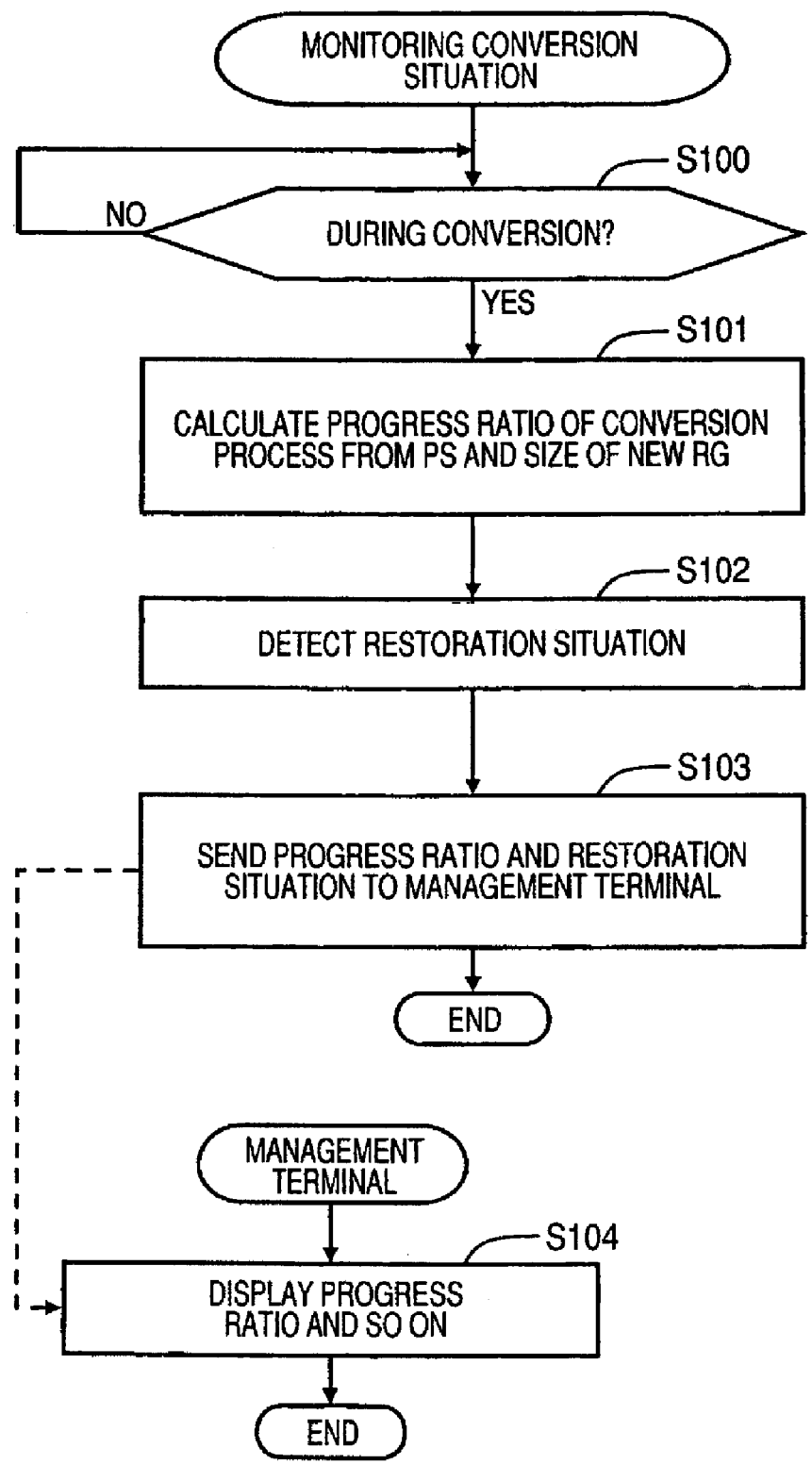
FIG. 16 is a flowchart showing a process for monitoring the conversion situation in the second example.

Referring to FIG. 16, a second example will be described below. Since this example corresponds to a variation of the first example, the different points from the first example will be mainly described below. In this example, a progress situation of the conversion process is notified to the management terminal 30.

FIG. 16 is a flowchart showing a process for monitoring the conversion situation. The controller 100 determines whether or not the conversion process is being performed (S100). If the conversion process is being performed (S100: YES), the controller 100 calculates the progress ratio of the conversion process, based on the initial address Ps of the unconverted area and the storage capacity of the new RAID group (S101).

Further, the controller 100 detects the restoration situation (S102), if the interrupted conversion process is resumed. And the controller 100 notifies the progress ratio of the conversion process and the restoration situation to the management terminal 30 (S103). The management terminal 30 displays the progress ratio and the restoration situation received from the controller 100 on the terminal screen (S104).

This example as configured above achieves the same effects as the first example. Further, in this example, the progress ratio of the conversion process and the restoration situation are monitored and notified to the management terminal 30, whereby the convenience of the user is improved.

The present invention is not limited to the above forms. It will be appreciated to those skilled in the art that various additions and modifications may be made without departing from the spirit or scope of the invention. For example, the controller 100 and the HDU 200 are not necessarily provided within the same housing, but may be provided within different housings. Also, the controller 100 and the HDU 200 may be provided in different sites.

Further, the second memory for saving each address Pe, PS is not limited to the flash memory 140, but may be another non-volatile storage device such as the disk drive. Also, the second memory may be provided outside the controller 100 (e.g., within the management terminal 30).

What is claimed is:

1. A control method for storage control device including a plurality of first storage devices, the control method comprising:
configuring a first RAID group on the plurality of first storage devices by a first RAID configuration;
adding one or more second storage devices to the first RAID group to configure a second RAID group by a second RAID configuration;
reading first data according to the first RAID configuration from first address of the first RAID group;
converting the first data, which are stored according to the first RAID configuration, to second data by adding new parity data which are created according to the second RAID configuration, and converting the first address to second address according to the second RAID configuration; and
storing the converted second data according to the second RAID configuration in the converted second address of the second RAID group comprising the plurality of first storage devices and the one or more second storage devices,
wherein the second RAID group comprising the plurality of first storage devices and the one or more second storage devices are configured to include 1) a plurality of first areas storing data that are not converted data according to the second RAID configuration, 2) a plurality of second areas storing converted data according to the second RAID configuration and 3) a plurality of third areas storing data that are not converted data according to the second RAID configuration and are corresponding to the converted data,
wherein the converted second data are stored in the third areas.

2. The control method according to claim 1, wherein the first read data are read from the first storage areas.

3. The control method according to claim 1, further comprising:
storing temporarily the read first data in a cache memory.

4. The control method according to claim 1, further comprising:
- storing an initial address of a plurality of first areas storing data that are not converted into data according to the second RAID configuration, and a last address in a plurality of second areas storing converted data according to the second RAID configuration in a cache memory;
- copying the initial address and the last address from the cache memory to a flash memory; and
- resuming conversion process based on the initial address and the last address stored in the flash memory.

5. The control method according to claim 4, further comprising:
- copying the initial address and the last address from the cache memory to the flash memory when the last address in the cache memory is matched initial address stored in the flash memory.

6. The control method according to claim 1,
- wherein converting the first data to the second data, and converting the first address to second address are performed asynchronously with reading the first data from the first address of the first RAID group.

7. A storage system comprising:
- a plurality of first storage devices which are controlled as a first RAID group by a first RAID configuration;
- one or more second storage devices added to the first RAID group; and
- a controller configured to:
- change the first RAID group into a second RAID group comprising the plurality of first storage devices and the one or more second storage devices,
- read first data according to the first RAID configuration from first address of the first RAID group,
- convert the first data, which are stored according to the first RAID configuration, to second data by adding new parity data which are created according to second RAID configuration of the second RAID group,
- convert the first address to second address according to the second RAID configuration, and
- store the converted second data, according to the second RAID configuration, in the converted second address of the second RAID group comprising the plurality of first storage devices and the one or more second storage devices,
- wherein the second RAID group comprising the plurality of first storage devices and the one or more second storage devices are configured to include 1) a plurality of first areas storing data that are not converted data according to the second RAID configuration, 2) a plurality of second areas storing converted data according to the second RAID configuration and 3) a plurality of third areas storing data that are not converted data according to the second RAID configuration and are corresponding to the converted data,
- wherein the converted second data are stored in the third areas.

8. The storage system according to claim 7, wherein the controller is configured to read the first data from the first storage areas.

9. The storage system according to claim 7, further comprising:
- the read first data are temporarily stored in a cache memory.

10. The storage system according to claim 7, further comprising:
- a cache memory configured to store an initial address of a plurality of first areas storing data that are not converted into data according to the second RAID configuration, and a last address in a plurality of second areas storing converted data according to the second RAID configuration; and
- a flash memory configured to store the initial address and the last address which are copied from the cache memory;
- wherein the controller is configured to resume conversion process based on the initial address and the last address stored in the flash memory.

11. The storage system according to claim 10,
- wherein the controller is configured to copy the initial address and the last address from the cache memory to the flash memory when the last address in the cache memory is matched initial address stored in the flash memory.

12. The storage system according to claim 7,
- wherein the controller is configured to convert the first data to the second data and convert the first address to second address asynchronously with reading the first data from the first address of the first RAID group.

* * * * *